(12) United States Patent
Jiang et al.

(10) Patent No.: US 10,185,894 B2
(45) Date of Patent: Jan. 22, 2019

(54) PICTURE MANAGEMENT METHOD AND DEVICE, PICTURE SYNCHRONIZATION METHOD AND DEVICE

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Yuning Jiang, Beijing (CN); Brian Li, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/888,625

(22) PCT Filed: Mar. 26, 2015

(86) PCT No.: PCT/CN2015/075138
§ 371 (c)(1),
(2) Date: Aug. 31, 2016

(87) PCT Pub. No.: WO2016/149943
PCT Pub. Date: Sep. 29, 2016

(65) Prior Publication Data
US 2016/0371566 A1    Dec. 22, 2016

(51) Int. Cl.
*G06K 9/62* (2006.01)
*G06F 17/30* (2006.01)
(Continued)

(52) U.S. Cl.
CPC .......... *G06K 9/6267* (2013.01); *G06F 17/30* (2013.01); *G06F 17/3028* (2013.01);
(Continued)

(58) Field of Classification Search
CPC ......... G06F 17/30073; G06F 17/30268; G06F 17/3028; G06F 21/00; G06F 21/6245; G06K 9/4671
See application file for complete search history.

(56) References Cited

U.S. PATENT DOCUMENTS 7,523,313 B2    4/2009 Noguchi
2006/0157551 A1    7/2006 Kim et al.
(Continued)

FOREIGN PATENT DOCUMENTS

CN    1506922    *    6/2004
CN    101370069        2/2009
(Continued)

OTHER PUBLICATIONS

Machine English translation of Takeda et al (CN 1506922), Accessed Dec. 4, 2017.*
(Continued)

*Primary Examiner* — Edward Park
(74) *Attorney, Agent, or Firm* — Hamre, Schumann, Mueller & Larson, P.C.

(57) ABSTRACT

A picture management method and device, a picture synchronization method and device are disclosed. The picture management method can be applied to a client device, and comprises: receiving picture tags generated by a server device performing an image analysis based on original picture features received by the server device, the original picture feature being an original picture itself or original picture parameter(s); and classifying and archiving the original pictures represented by the original picture features
(Continued)

according to the picture tags. The picture management method can be applied to a server device, and comprises: receiving original picture features and encrypted original pictures, the original picture feature being an original picture itself or original picture parameter(s); generating pictures tag by performing an image analysis on the received original picture features, and discarding the original picture features after generating the picture tags; and classifying and archiving the encrypted original pictures represented by the original picture features according to the picture tags. An intelligent classification and archiving of pictures based on the content of the pictures can be implemented by using said methods, and backup and sharing of picture data can be implemented through the server device while ensuring security of the picture data.

3 Claims, 6 Drawing Sheets (51) Int. Cl.
*G06F 21/00* (2013.01)
*G06K 9/46* (2006.01)
*H04L 29/06* (2006.01)
*G06F 21/62* (2013.01)
*G06K 9/00* (2006.01)
*H04W 12/02* (2009.01)
*H04W 12/04* (2009.01)

(52) U.S. Cl.
CPC .. *G06F 17/30073* (2013.01); *G06F 17/30268* (2013.01); *G06F 21/00* (2013.01); *G06F 21/6245* (2013.01); *G06K 9/00677* (2013.01); *G06K 9/4671* (2013.01); *H04L 63/0435* (2013.01); *H04L 63/0442* (2013.01); *H04L 63/061* (2013.01); *H04L 63/062* (2013.01); *G06K 9/00228* (2013.01); *H04W 12/02* (2013.01); *H04W 12/04* (2013.01)

(56) References Cited

U.S. PATENT DOCUMENTS

| | | | | |
|---|---|---|---|---|
| 2008/0273213 | A1* | 11/2008 | Steinhart | G06F 3/1205 358/1.9 |
| 2008/0298596 | A1 | 12/2008 | Kuraki et al. | |
| 2009/0171783 | A1 | 7/2009 | Raju | |
| 2009/0249492 | A1* | 10/2009 | Boesgaard Sorensen | G06F 21/556 726/27 |
| 2012/0124389 | A1* | 5/2012 | Villani | G06F 21/6245 713/189 |
| 2014/0270494 | A1* | 9/2014 | Sawhney | G06K 9/00979 382/159 |
| 2015/0104013 | A1* | 4/2015 | Holman | G06F 21/602 380/243 |
| 2015/0331929 | A1* | 11/2015 | El-Saban | G06F 17/30598 707/739 |
| 2015/0339325 | A1* | 11/2015 | Oranje | G06F 17/30268 707/738 |
| 2016/0026628 | A1* | 1/2016 | Sears | G06F 17/3028 382/199 |
| 2016/0371566 | A1* | 12/2016 | Jiang | G06F 17/30073 |
| 2018/0107660 | A1* | 4/2018 | Wang | G06F 17/3028 |

FOREIGN PATENT DOCUMENTS

| | | | |
|---|---|---|---|
| CN | 101960481 | * | 1/2011 |
| CN | 103207870 | | 7/2013 |
| CN | 103942469 | | 7/2014 |
| CN | 104281814 | | 1/2015 |

OTHER PUBLICATIONS

Machine English translation of Raju (CN 101960481), Accessed Dec. 4, 2017.*
International Search Report and Written Opinion issued in the corresponding International application No. PCT/CN2015/075138, dated Dec. 15, 2015, 19 pages.
First Office Action, issued in the corresponding Chinese patent application No. 201580000354.9, dated Jun. 5, 2018 , 41 pages.

* cited by examiner

PICTURE MANAGEMENT METHOD AND DEVICE, PICTURE SYNCHRONIZATION METHOD AND DEVICE

TECHNICAL FIELD OF THE DISCLOSURE

The present disclosure relates to picture management method and device, and picture synchronization method and device.

BACKGROUND

With miniaturization of hardware such as processor, memory chip, camera and so on, terminal devices such as mobile phone, Pad or the like are taking over more and more functions of collecting and storing information such as sound and image in addition to being used as daily communication tools. For example, according to statistics, the number of pictures that are taken by the terminal devices such as mobile phone, Pad or the like goes beyond the order of one billion. Accordingly, it is a significant and prospective development direction of how to help users organize and manage picture data efficiently and intelligently.

Currently, there are a lot of products used for organizing and managing picture data which can be applied to the terminal devices, such as various mobile phone album applications. Most of these existing mobile phone album applications classify and manage the pictures based on photographing time or location, and do not analyze or make use of the content of the pictures. Thus when the user wants to look for a certain picture that he or she took before or to import a certain picture from elsewhere, he or she can look for it only from the photographing time or location, which is very inconvenient when the user is not sure about the photographing time or location. Some other mobile phone album applications classify and manage the pictures by way of a picture tag. However, the picture tag can be only generated manually due to lacking of intelligent generation tools based on the picture content, and thus the picture data can not be processed in batch. In another aspect, part of the existing mobile phone album applications store the picture data only on local terminal devices, and thus the user can not access the picture data stored in one terminal device if he or she uses another terminal device. In view of this, some mobile phone album application products perform synchronization and backup for the picture data through a cloud platform which makes the picture data can be shared on a plurality of terminal devices the user owns. However, all the picture data of the user may be stolen or leaked once a security bug occurs in the cloud platform.

SUMMARY

The present disclosure is made in view of the above problems. In specific, one object of the present disclosure is to provide a picture management technique by which the pictures can be classified and archived and index can be created for the pictures by using tags which are generated by analyzing content of the pictures automatically, so that the search and management of the pictures by the user can be more precise and humanized. Another object of the present disclosure is to provide a picture synchronization technique by which picture data can be shared among a plurality of client devices while ensuring the security the picture data.

According to an aspect of the present disclosure, there is provided a picture management method applied to a client device, the method comprising: receiving picture tags generated by a server device performing an image analysis based on original picture features received by the server device, the original picture feature being an original picture itself or original picture parameter(s); and classifying and archiving the original pictures represented by the original picture features according to the picture tags.

Optionally, the original pictures are stored locally in the client device to which the picture management method is applied. In the case that the original picture feature is the original picture parameter, the picture management method further comprises: transmitting the original pictures to the server device.

Optionally, the original pictures are stored locally in the client device to which the picture management method is applied. In the case that the original picture feature is the original picture parameter, the picture management method further comprises: generating a unique key bonded with the client device; encrypting the original pictures with the unique key; and transmitting the encrypted original pictures to the server device.

Optionally, the original picture feature is the original picture parameter(s), and the picture management method further comprises receiving, before classifying and archiving the original pictures represented by the original picture features according to the picture tags, the original pictures which the server device received from another client device different from said client device.

Optionally, the original picture feature is the original picture parameter(s), and the picture management method further comprises before classifying and archiving the original pictures represented by the original picture features according to the picture tags: receiving encrypted original pictures which the server device received from another client device different from said client device; receiving a unique key which is used for encrypting the original pictures from another device different from said server device; and decrypting the encrypted original pictures with the unique key to obtain the original pictures. Wherein said receiving the unique key which is used for encrypting the original pictures from another device different from said server device further comprises: receiving the unique key from said another client device, or receiving from another server device the unique key which is transmitted to said another server device from said another client device.

According to another aspect of the present disclosure, there is provided a picture management method applied to a server device, the method comprising: receiving original picture features and encrypted original pictures, the original picture feature being an original picture itself or original picture parameter(s); generating pictures tag by performing an image analysis on the received original picture features, and discarding the original picture features after generating the picture tags; and classifying and archiving the encrypted original pictures represented by the original picture features according to the picture tags.

According to another aspect of the present disclosure, there is provided a picture synchronization method applied to a client device, comprising: downloading, from a server device, encrypted original pictures which are generated and uploaded to the server device by another client device; receiving a unique key which is used in encrypting original pictures from another device different from the server device, and decrypting the encrypted original pictures with the unique key to obtain the original pictures.

Optionally, according to the picture synchronization method, the client device receives the unique key from said another client device.

Optionally, according to the picture synchronization method, the client device receives from another server device the unique key which is transmitted to said another server device from said another client device.

According to another aspect of the present disclosure, there is provided a picture management device comprising: a tag receiving part configured to receive picture tags generated by a server device performing an image analysis based on original picture features received by the server device, the original picture feature being an original picture itself or original picture parameter(s); and a managing part configured to classify and archive the original pictures represented by the original picture features according to the picture tags.

Optionally, the original pictures are stored locally in the client device to which the picture management device is applied. The original picture feature is the original picture parameter(s), and the picture management device further comprises a transmitting part configured to transmit the original pictures to the server device.

Optionally, the original picture is stored locally in the client device to which the picture management device is applied. The original picture feature is the original picture parameter(s), and the picture management device further comprises: a key generating part configured to generate a unique key bonded with the client device; an encrypting part configured to encrypt the original pictures with the unique key; and a transmitting part configured to transmit the encrypted original pictures to the server device.

Optionally, the picture management device further comprises a receiving part configured to receive the original pictures which the server device received from another client device different from said client device.

Optionally, the original picture feature is the original picture parameter(s), and the picture management device further comprises a picture receiving part configured to receive encrypted original pictures which the server device received from another client device different from said client device; a key receiving part configured to receive a unique key which is used for encrypting the original pictures from another device different from said server device; and a decrypting part configured to decrypt the encrypted original pictures with the unique key to obtain the original pictures. Optionally, said key receiving part can be configured to receive the unique key from said another client device, or receiving from another server device the unique key which is transmitted to said another server device from said another client device.

According to another aspect of the present disclosure, there is provided a picture management device comprising a receiving part configured to receive original picture features and encrypted original pictures, the original picture feature being an original picture itself or original picture parameter(s); a tag generating part configured to generate picture tags by performing an image analysis on the received original picture features, and discard the original picture features after generating the picture tags; and a managing part configured to classify and archive the encrypted original pictures represented by the original picture features according to the picture tags.

According to another aspect of the present disclosure, there is provided a picture synchronization device comprising: a downloading part configured to download, from a the server device, encrypted original pictures which are generated and uploaded to the server device by another client device; a key receiving part configured to receive a unique key which is used in encrypting original pictures from another device different from the server device, and a decrypting part configured to decrypt the encrypted original pictures with the unique key to obtain the original pictures.

Optionally, the key receiving part is configured to receive the unique key from said another client device.

Optionally, the key receiving part is configured to receive from another server device the unique key which is transmitted to said another server device from said another client device.

According to another aspect of the present disclosure, there is provided a picture management system comprising one or more processor; a memory for storing computer program instructions. The computer program instructions, when being executed by at least one of the processors, perform the processes of receiving picture tags generated by a server device performing an image analysis based on original picture features received by the server device, the original picture feature being an original picture itself or original picture parameter(s); and classifying and archiving the original pictures represented by the original picture features according to the picture tags.

Optionally, the original pictures are stored in the memory. In the case that the original picture feature is the original picture parameter(s), the computer program instructions, when being executed by at least one of the processors, further perform the process of transmitting the original pictures to the server device.

Optionally, the original pictures are stored in the memory. In the case that the original picture feature is the original picture parameter(s), the computer program instructions, when being executed by at least one of the processors, further perform the process of generating a unique key bonded with the client device; encrypting the original pictures with the unique key; and transmitting the encrypted original pictures to the server device.

Optionally, the original picture feature is the original picture parameter(s), and the computer program instructions, when being executed by at least one of the processors, further perform the process of: receiving the original pictures which the server device received from another client device different from the client device.

Optionally, the original picture feature is the original picture parameter(s), and the computer program instructions, when being executed by at least one of the processors, further perform the processes of: receiving encrypted original pictures which the server device received from another client device different from said client device; receiving a unique key which is used for encrypting the original pictures from another device different from said server device; and decrypting the encrypted original pictures with the unique key to obtain the original pictures. Wherein the process of receiving the unique key which is used for encrypting the original picture from another device different from said server device performed when the computer program instructions are executed by the at least one of the processors further comprises: receiving the unique key from said another client device, or receiving from another server device the unique key which is transmitted to said another server device from said another client device.

According to another aspect of the present disclosure, there is provided a picture management system comprising one or more processor; and memory for storing computer program instructions. The computer program instructions, when being executed by at least one of the processors, perform the processes of receiving original picture features and encrypted original pictures, the original picture feature being an original picture itself or original picture parameter(s); generating picture tags by performing an image analysis on the received original picture features, and discarding the original picture feature after generating the picture tags; and classifying and archiving the encrypted original pictures represented by the original picture features according to the picture tags.

According to another aspect of the present disclosure, there is provided a picture synchronization system comprising one or more processor; and memory for storing computer program instructions. The computer program instructions, when being executed by at least one of the processors, perform the processes of downloading, from a server device, encrypted original pictures which are generated and uploaded to the server device by one client device; receiving a unique key which is used in encrypting original pictures from a device different from the server device, and decrypting the encrypted original pictures with the unique key to obtain the original pictures.

Optionally, said receiving the unique key which is used in encrypting original pictures from the device different from the server device further comprises receiving the unique key from said one client device.

Optionally, said receiving the unique key which is used in encrypting original pictures from the device different from the server device further comprises receiving from another server device the unique key which is transmitted to said another server device from said one client device.

According to the picture management method, device and system in the aspects as described above, the pictures can be classified and archived and index can be create for the pictures by using tags which are generated by analyzing content of the pictures automatically and intelligently, so that the search and management of the pictures by the user can be more precise and humanized. In addition, according to the picture synchronization method, device and system in the aspects as described above, the encrypted pictures and the key are managed by two separate devices, and thus the original pictures can be recovered only when both the encrypted pictures and the key are obtained from the two separate devices, therefore, the picture sharing among a plurality of terminal devices can be implemented while ensuring the security of the picture date.

BRIEF DESCRIPTION OF THE DRAWINGS

Through the more detailed description of embodiments of the present disclosure with reference to the accompanying drawings, the above and other objects, features and advantages of the present disclosure will become more apparent. The drawings provide further understanding of the embodiments of the present disclosure, constitute part of the specification and explain the present disclosure together with the embodiments of the present disclosure. In the drawings, the same reference signs generally refer to the same components or steps.

FIG. 9(*a*) shows an exemplary structural block diagram of a picture management device according to an embodiment of the present disclosure, and FIG. 9(*b*) shows an exemplary structural block diagram of a picture management device according to another embodiment of the present disclosure.

DETAILED DESCRIPTION

A clear and complete description of the technical solutions of the embodiments of the present disclosure will be provided with reference to the figures in the embodiments. It is obvious that the embodiments described herein are only part of the present disclosure but not all of the embodiments. Based on the embodiments in the present disclosure, all the other embodiments obtained by those skilled in the art without creative effort fall into the protection scope of the present disclosure.

Figure 1:
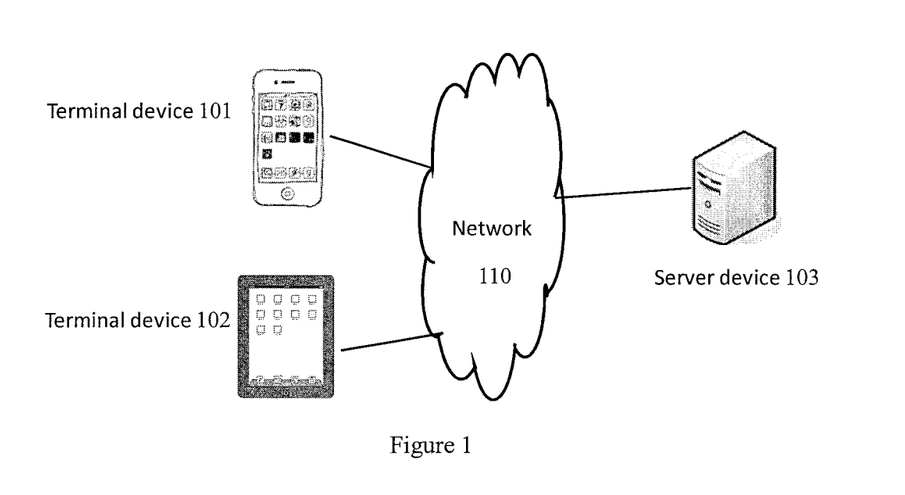
FIG. 1 schematically shows an exemplary scene to which the picture management technique and the picture synchronization technique according to embodiments of the present disclosure are applied.

FIG. 1 schematically shows an exemplary scene to which the picture management technique and the picture synchronization technique according to the embodiments of the present disclosure are applied. As shown in FIG. 1, this exemplary scene includes terminal devices 101 and 102 and a server device 103, and the terminal devices 101 and 102 are interconnected with the server device 103 via a network 110. The picture management technique according to the embodiments of the present disclosure can be applied to the terminal devices 101 and 102 and the server device 103, so as to organize and manage the pictures stored therein. In another aspect, the terminal devices 101 and 102 can use the picture synchronization technique according to the embodiments of the present disclosure, so as to perform backup and synchronization of the pictures with each other through the server device 103. Although the server device 103 is shown as a single device in FIG. 1, it also can be a set of devices.

Figure 2:
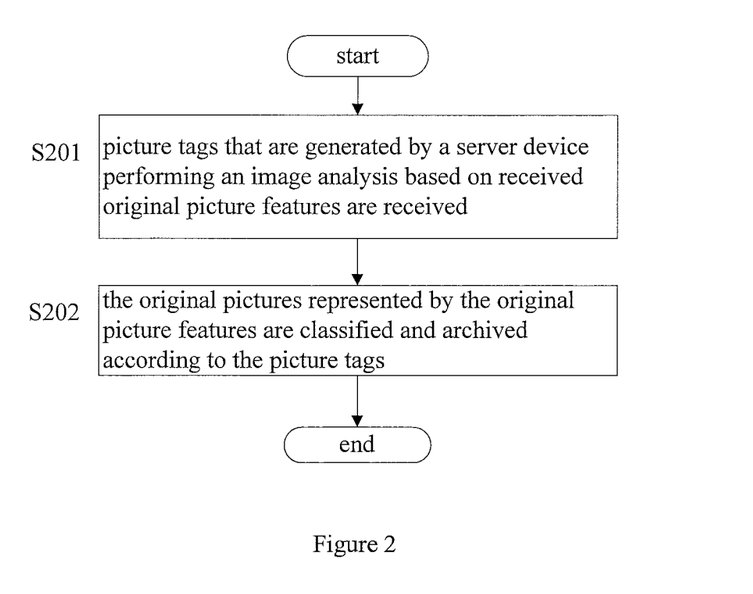
FIG. 2 shows a flow chart of a picture management method according to an embodiment of the present disclosure.

FIG. 2 shows a flow chart of a picture management method 200 according to an embodiment of the present disclosure. The picture management method 200 can be applied to client devices, such as the terminal device 101 or 102 as shown in FIG. 1. The picture management method according to the present embodiment will be described below with reference to FIG. 2.

As shown in FIG. 2, at step S201, picture tags that are generated by a server device performing an image analysis based on received original picture features are received.

With reference to FIG. 1, at this step, for example, the terminal device 101 or 102 as shown in FIG. 1 receives, from the server device 103, the picture tags which are generated by the server device 103 performing an image analysis on the received original picture features.

The original picture feature is the original picture itself or original picture parameter(s). The original picture parameter is any suitable parameter that is related to the original picture and can be used for performing an image analysis. For example, it can be compressed codes of the original picture to be organized and managed, an image feature of the original picture, or the combination thereof. The image feature of the original picture is the feature that can be used to analyze the image in the current image processing field, such as Histogram of Gradient (HOG), Scale-invariant Feature Transform (SIFT), characteristic layer of depth network or the like.

Figure 3:
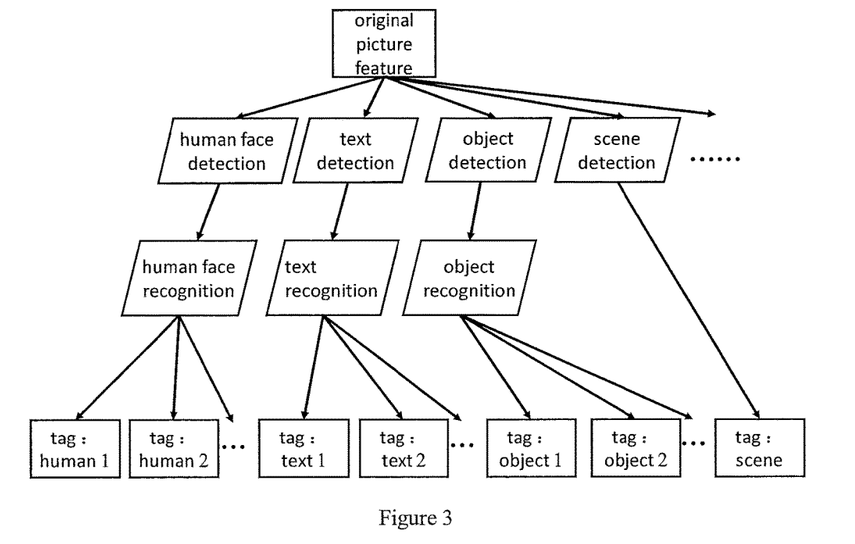
FIG. 3 illustrates a possible processing situation in which a server device performs an image analysis on original picture features to generate picture tags.

The server device performs various suitable image analyses on the received original picture features to generate the picture tags reflecting the content of the pictures. FIG. 3 illustrates a possible processing situation in which the server device performs an image analysis on the original picture features to generate the picture tags.

As shown in FIG. 3, the server device performs various image processes including (but not limited to) human face detection/recognition, text detection/recognition, object detection/recognition and scene recognition on the original picture features. The human face detection/recognition is used for detecting whether a human face is contained in the picture or not, and recognizing the human face when the human face is detected so as to use one or more specific person that is recognized as the picture tag. The text detection/recognition is used for detecting whether text (e.g., books, signboards of shops or the like) exists in the picture or not, and recognizing the text when the text is detected so as to use one or more specific text that is recognized as the picture tag. The object detection/recognition is used for detecting whether an object (e.g., car, bicycle, house or the like) exists in the picture or not, and recognizing the object when the object is detected so as to use one or more specific object that is recognized as the picture tag. The scene recognition is used for determining a scene mode of the picture (e.g., indoor or outdoor) and using the determined scene mode as the picture tag. The human face detection/recognition, the text detection/recognition, the object detection/recognition and the scene recognition based on the original picture feature (that is, based on the original picture itself or the original picture parameter) as described above can employ any existing image processing techniques in the art and details are omitted here. Through the image processes as described above, the content of the original pictures can be analyzed automatically and intelligently and thus the picture tags reflecting the content of the pictures can be generated. It can be understood that the image processes as described above are only examples but not limitation to the present disclosure, and those skilled in the art can use any other suitable image processing manner so as to obtain the picture tags that can reflect the content of the pictures.

At step S202, the original pictures represented by the original picture features are classified and archived according to the picture tags.

As described earlier, the picture tag is generated based on the original picture feature, and the original picture feature is the compressed codes and/or an image feature that can represent the original picture or the original picture itself. Therefore, at this step, after receiving the picture tags reflecting the content of the picture, the client device can perform various picture managements, such as classifying and archiving, creating index or the like, on the original pictures represented by the original picture features based on the picture tags.

A general description of the picture management method 200 according to the present embodiment has been given with reference to FIG. 2. According to the picture management method 200, the client device can classify and archive the original pictures, create index for the original pictures and so on based on the content of the pictures, so that the user can search the pictures according to the content thereof, which makes the search more efficient and humanized. In another aspect, according to the picture management method 200, the picture tags are not generated locally on the client device but generated by the server device performing image processing, thus the client device does not need a large amount of resources for performing a large amount of data calculations.

The picture management method 200 as described above can be applied to not only the client device which initially stores the original pictures locally, but also the client device which does not initially store the original pictures locally. The two situations will be further described below, respectively.

As an example, when the picture management method 200 is applied to the client device A which initially stores the original pictures locally (hereinafter referred to "client device A" for short), in the case that the original picture feature is the original picture parameter, the method 200 can further include: the client device A transmits the original pictures to the server device. Of course, in the case that the original picture feature is the original picture itself, the step of transmitting the original pictures does not need to be performed. After receiving the picture tags generated by the server device, the client device A classifies and archives the original pictures locally stored therein based on the picture tags. In addition, in this case, the original picture features received by the server device are also from the client device A. On the contrary, as an example, when the picture management method 200 is applied to the client device B which does not initially store the original pictures locally (hereinafter referred to "client device B" for short), the method 200 can further include that the client device B receives the original pictures that the server device receives from a client device A other than the client device B, before classifying and archiving the original pictures based on the picture tags. Thereby, after receiving the picture tags generated by the client device, the client device B can classify and archive the original pictures downloaded from the server device based on the picture tags.

As another example, when the picture management method 200 is applied to the client device A and the original picture feature is the original picture parameter, the method 200 can further include: generating a unique key bonded with the client device A, encrypting the original pictures with the unique key, and transmitting the encrypted original pictures to the server device. According to this example, the client device A transmits the original picture parameters instead of the original pictures to the server device, and generates the key and transmits the original pictures encrypted with the key to the server device, Therefore, the server device can not obtain the original pictures, which may prevent the original pictures from leaking through the network, and thus ensure the security of the picture data. On the contrary, as an example, when the picture management method 200 is applied to the client device B and the original picture feature is the original picture parameter(s), the method 200 can further include that, before classifying and archiving the original pictures based on the picture tags, the client device B receives the encrypted original pictures which the server device receives from a client device A other than the client device B, receives the unique key which is used for encrypting the original pictures from another device different from the server device, and decrypts the encrypted original pictures with the unique key to obtain the original pictures. Said another device different from the server device may be the client device A which generates the unique key, in which case the client device B receives the unique key from the client device A; or said another device different from the server device may also be another server device to which the client device A generating the key transmits the key in advance, in which case the client device B receives the unique key from said another server device. According to this example, the original pictures are not transmitted to the server device, and accordingly, the client device B downloads the encrypted original pictures instead of the original pictures from the server device, and the encrypted original pictures can be decrypted by using the key to recover the original pictures only when the key is obtained from another device different from the server device, so that the recovered original pictures can be classified and archived based on the picture tags. Therefore, the unauthorized devices are prevented from obtaining the original pictures and thus the security of the picture data is ensured.

Figure 4:
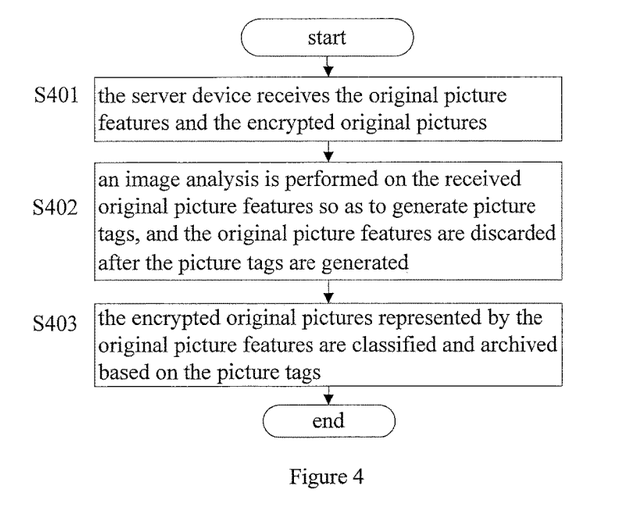
FIG. 4 shows a flow chart of a picture management method according to another embodiment of the present disclosure.

FIG. 4 shows a flow chart of a picture management method 400 according to another embodiment of the present disclosure. The picture management method 400 can be applied to a server device, such as the server device 103 as shown in FIG. 1. The picture management method according to this embodiment will be described below with reference to FIG. 4.

As shown in FIG. 4, at step S401, the server device receives the original picture features and the encrypted original pictures.

As this step, the server device receives the picture features of the original pictures to be organized and managed and the encrypted original pictures. As an example, the original picture features and the encrypted original pictures can be from a client device which stores a mass of original pictures and desires to perform picture backup on the server device.

As described above, the original picture feature is the original picture itself or original picture parameter(s). The original picture parameter is any suitable parameter that is related to the original picture and can be used for performing an image analysis. For example, it can be compressed codes of the original picture to be organized and managed, an image feature of the original picture or the combination thereof. The image feature of the original picture is the feature that can be used to analyze the image in the current image processing field, such as Histogram of Gradient (HOG), Scale-invariant Feature Transform (SIFT), characteristic layer of depth network or the like.

At step S402, an image analysis is performed on the received original picture features so as to generate picture tags, and the original picture features are discarded after the picture tags are generated.

The server device performs various suitable image analyses, such as human face detection and recognition, text detection and recognition, object detection and recognition, and scene recognition on the received original picture features so as to generate picture tags reflecting the content of the pictures. The processing manners as described above with reference to FIG. 3 can be used in the specific process of this step and the details are omitted herein.

The server device discards the original picture features initiatively after generating the picture tags. In this way, it can be ensured that the server device will not save the original pictures, whereby the possible leakage of the original pictures on the server device and the data security issue resulted thereby can be avoided.

At step S403, the encrypted original pictures represented by the original picture features are classified and archived based on the picture tags.

As described above, the picture tags are generated based on the original picture features, and the original picture features is the compressed codes and/or an image feature that can represent the original picture or the original picture itself. Therefore, at this step, after generating the picture tags reflecting the content of the pictures, various picture managements, such as classifying and archiving, creating index or the like, can be performed on the encrypted original pictures received based on the picture tags.

A description of the picture management method 400 according to the present embodiment has been given with reference to FIG. 4. According to the picture management method 400, the server device classifies and archives the original pictures, creates index for the original pictures and so on based on the content of the pictures, so that the pictures can be searched according to the content thereof, which makes the search more efficient and humanized. In another aspect, the server device discards the original picture features initiatively after generating the picture tags by using the original picture features, therefore, the possible leakage of the original pictures on the server device can be avoided. Accordingly, the server device classifies and archives the encrypted original pictures instead of the original pictures and thus the picture data can be secured while the pictures are managed based on the content thereof on the server device.

It is to be noted that in the picture management method as described above with reference to FIG. 4, the server device classifies and archives the encrypted original pictures instead of the original pictures themselves. However, when the security of the picture data is not required, alternatively, the server device may classify and archive the original pictures themselves instead of the encrypted original pictures. That is, the server device receives the original pictures at the above step S401, does not discard the original pictures after generating the picture tags at step S402, and accordingly classifies and archives the original pictures based on the picture tags at step S403. According to this alternative implementation, the server device can still classify and archive the pictures, create index for the pictures and so on based on the content of the pictures, so that the pictures can be searched based on the content of the pictures.

In the following, some specific examples in which the picture management method according to the embodiments of the present disclosure as described above is applied will be described with reference to FIGS. 5 to 7.

Figure 5:
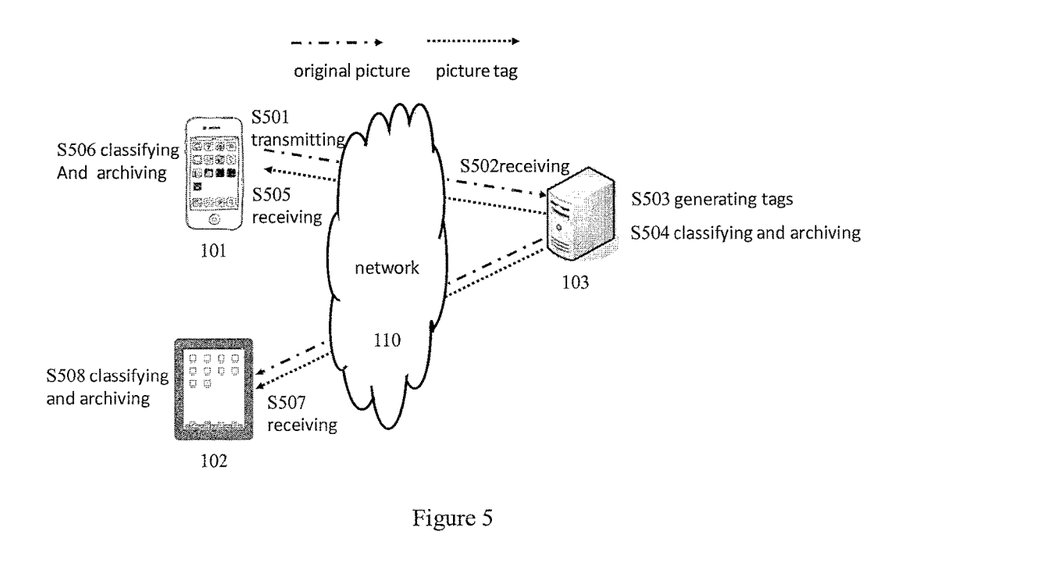
FIG. 5 shows a specific example of the picture management method according to the embodiment of the present disclosure.

FIG. 5 shows a specific example in which the picture management method according to the embodiment of the present disclosure is applied. In this example, the network security of the picture data is not taken into account. As shown in FIG. 5, in this example, there are two terminal devices 101 and 102 and a server device 103. It is assumed herein that the original pictures to be managed are initially stored in the terminal device 101 for the ease of description.

As shown in FIG. 5, at step S501, the terminal device 101 transmits the original pictures to the server device 103. The server device 103 receives the original pictures at step S502. The server device 103 performs an image analysis on the received original pictures to generate the picture tags at step S503. The server device 103 classifies and archives the original pictures based on the picture tags at step S504. The terminal device 101 receives the picture tags from the server device 103 at step S505. The terminal device 101 classifies and archives the original pictures based on the picture tags at step S506. The terminal device 102 receives the original pictures and the picture tags from the server device 103 at step S507. The terminal device 102 classifies and archives the received original pictures based on the picture tags at step S508.

The specific processes of the above steps are the same as those in the corresponding steps in the picture management methods described with reference to FIGS. 2 and 4, and thus the details are omitted here. In the example shown in FIG. 5, the intelligent classification and archiving of the pictures based on the content of the pictures are implemented on different terminal devices 101 and 102, and the backup and sharing of the picture data can be implemented through the server device 103.

It is to be noted that the server device 103 is shown as a single device in FIG. 5, optionally, it can be a set of server devices each of which performs part of the operations of the server side. As an example, the server device 103 may include a server device 103a (not shown) for performing an image analysis to generate picture tags, and a server device 103b (not shown) for storing the picture data and the picture tags and performing the classification and archiving of the pictures. It can be understood that according to this example, steps S502 and S503 are performed by the server device 103a, step S504 is performed by the server device 103b, and a further step that the server device 103a transmits the original pictures and the generated picture tags to the server device 103b can be included between steps S503 and S504.

Figure 6:
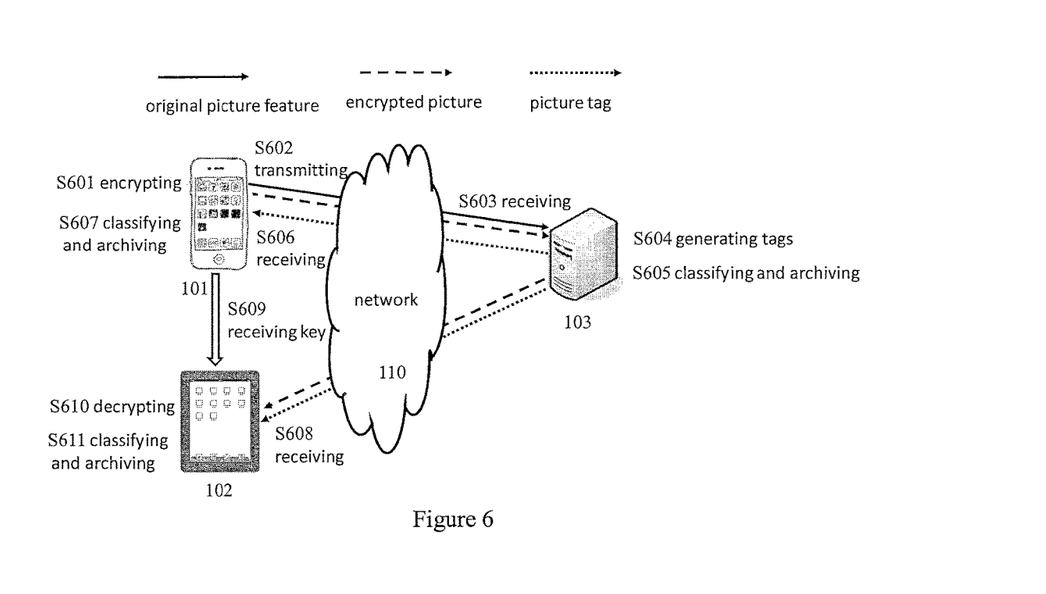
FIG. 6 shows another specific example of the picture management method according to the embodiment of the present disclosure.

FIG. 6 shows another specific example in which the picture management method according to another embodiment of the present disclosure is applied. In this example, the network security of the picture data is taken into account. As shown in FIG. 6, in this example, there are two terminal devices 101 and 102 and a server device 103. It is assumed herein that the original pictures to be managed are initially stored in the terminal device 101 for the ease of description.

As shown in FIG. 6, at step S601, the terminal device 101 generates a unique key bonded therewith, and encrypts the original pictures with the unique key so as to generate corresponding encrypted original pictures. At step S602, the terminal device 101 transmits the original picture features and the encrypted original pictures to the server device 103. At step S603, the server device 103 receives the original picture features and the encrypted original pictures. At step S604, the server device 103 performs an image analysis on the received original picture features to generate the picture tags and discards the original picture features after generating the picture tags. The server device 103 classifies and archives the encrypted original pictures based on the picture tags at step S605. The terminal device 101 receives the picture tags from the server device 103 at step S606. The terminal device 101 classifies and archives the original pictures based on the picture tags at step S607. The terminal device 102 downloads the encrypted original pictures and the picture tags from the server device 103 at step S608. The terminal device 102 receives the unique key which is used in encrypting the original pictures from the terminal device 101 at step S609. The terminal device 102 decrypts the encrypted original pictures with the unique key to obtain the original pictures at step S610. The terminal device 102 classifies and archives the received original pictures based on the picture tags at step S611.

The specific processes of the above steps are the same as those in the corresponding steps in the picture management methods described with reference to FIGS. 2 and 4, and thus the details are omitted herein. In the example shown in FIG. 6, the intelligent classification and archiving of the pictures based on the content of the pictures are implemented on different terminal devices 101 and 102, and the backup and sharing of the picture data can be implemented through the server device 103. Meanwhile, since the original pictures can be recovered only when both the encrypted pictures and the key are obtained, the key is not transmitted to the server device 103, and the server device initiatively discards the original picture features after generating the picture tags, the original pictures can not be obtained from the server device, thereby ensuring the security the picture data.

It is to be noted that the server device 103 is shown as a single device in FIG. 6, optionally, it can be a set of server devices each of which performs part of the operations of the server side. As an example, the server device 103 may include a server device 103a for performing an image analysis to generate picture tags, and a server device 103b for storing the picture data and the picture tags and performing the classification and archiving of the pictures.

As another example, in the case that the server device 103 includes the server device 103a and the server device 103b as described above, steps S603 and S604 are performed by the server device 103a, step S605 is performed by the server device 103b, and a further step that the server device 103a transmits the encrypted original pictures and the generated picture tags to the server device 103b can be included between steps S604 and S605. As another example, step S603 can be performed by the server device 103a together with the server device 103b, wherein the server device 103a receives the original picture features and the server device 103b receives the encrypted original pictures; step S604 is performed by the server device 103a; step S605 is performed by the server device 103b; and a further step that the server device 103a transmits the generated picture tags to the server device 103b can be included between steps S604 and S605. As another example, step S603 can be performed by the server device 103a together with the server device 103b, wherein the server device 103a receives the original picture features and the server device 103b receives the encrypted original pictures; step S604 is performed by the server device 103a; step S605 is performed by the server device 103b; and a further step that the server device 103a transmits the generated picture tags to the terminal device 101 which in turn transmits the picture tags to the server device 103b can be included between steps S604 and S605.

Figure 7:
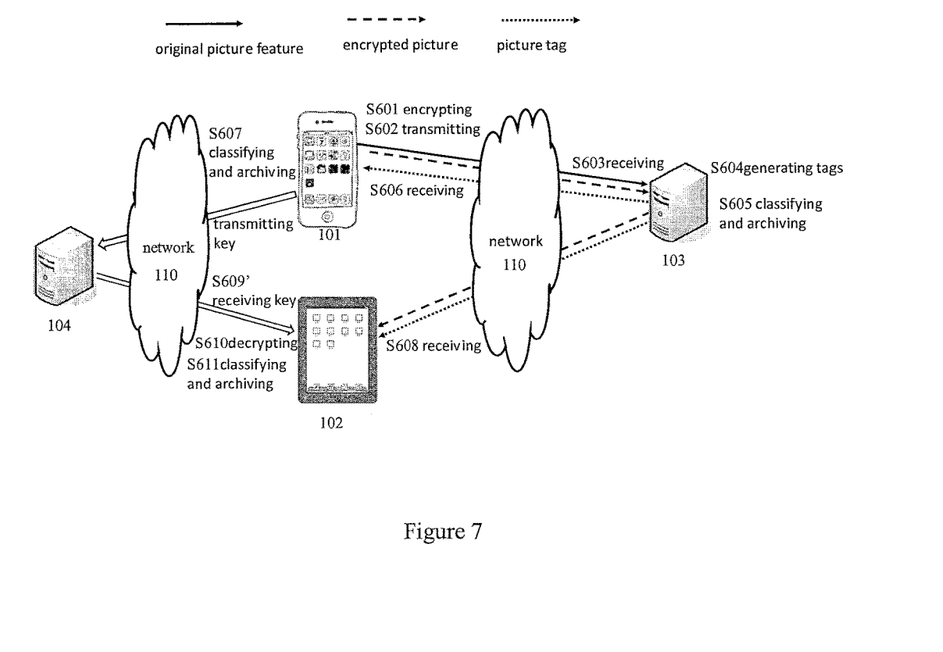
FIG. 7 shows still another specific example of the picture management method according to the embodiment of the present disclosure.

FIG. 7 shows another specific example in which the picture management method according to another embodiment of the present disclosure is applied. In this example, the network security of the picture data is taken into account. As shown in FIG. 7, in this example, there are two terminal devices 101 and 102 and two terminal devices 103 and 104. It is assumed herein that the original pictures to be managed are initially stored in the terminal device 101 for the ease of description.

The steps in the specific example shown in FIG. 7 are almost the same as those in the specific example shown in FIG. 6, and the only difference therebetween lies in that in step S609' corresponding to step S609 in FIG. 6, the terminal device 102 receives the unique key which is used in encrypting the original pictures from another server device 104, and prior to step S609', the terminal device 101 generating the key transmits the key to said another server device 104 in advance.

In the example shown in FIG. 7, the intelligent classification and archiving of the pictures based on the content of the pictures are implemented on different terminal devices 101 and 102, and the backup and sharing of the picture data can be implemented through the server device 103. Meanwhile, since the original pictures can be recovered only when both the encrypted pictures and the key are obtained, and the key is not transmitted to the server device 103, the original pictures can not be obtained from the server device, thereby ensuring the security of the picture data.

The picture management method according to the embodiments of the present disclosure and the exemplary application thereof have been described above in detail with reference to the drawings. In addition, the present disclosure actually also provides a picture synchronization method, which will be described below.

Figure 8:
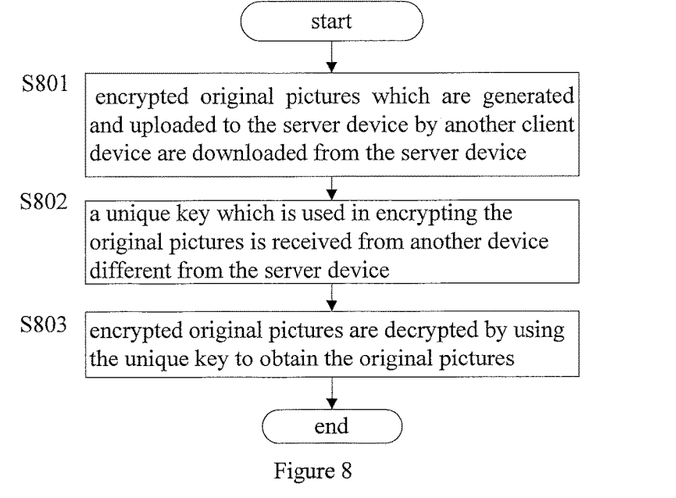
FIG. 8 shows a flow chart of a picture synchronization method according to an embodiment of the present disclosure.

FIG. 8 shows a flow chart of a picture synchronization method 800 according to an embodiment of the present disclosure. The picture synchronization method 800 can be applied to a client device, such as the terminal device 101 or 102 as shown in FIG. 1. The picture synchronization method according to this embodiment will be described below with reference to FIGS. 1 and 8. For the ease of explanation, in this embodiment, the description will be given with respect to the example that the picture synchronization method 800 is applied to the client device 102 so that the original pictures in the terminal device 101 are obtained by synchronization, and vice versa.

As shown in FIG. 8, at step S801, the encrypted original pictures which are generated and uploaded to the server device by another client device are downloaded from the server device.

As for the example as shown in FIG. 1, in this step S801, the terminal device 102 downloads from the server device 103 the encrypted original pictures which are generated and uploaded to the server device 103 by the client device 101. The terminal device 101 may generate the encrypted original pictures and upload them to the server device by the processes of generating a unique key bonded with the terminal device 101, encrypting the original pictures with the unique key, and transmitting the encrypted original pictures to the server device, as described above.

At step 802, a unique key which is used in encrypting the original pictures is received from another device different from the server device.

Still taking the exemplary situation as shown in FIG. 1 as an example, in this step, the terminal device 102 receives the unique key used in encrypting the original pictures from another device different from the server device 103.

As an example, said another device can be the terminal device 101 which generates the key. Consequently, in this example, the terminal device 102 receives the key from the terminal device 101 by using a network transmitting manner of non-backup such as P2P transmission, Bluetooth or the like.

As another example, said another device is another server device 104 to which the key is transmitted in advance by the terminal device 101 which generates the key. Consequently, in this example, said another server device 104 performs identity verification on the terminal device 102 to determine whether it is authorized to obtain the key, and the terminal device 102 obtains the key from said another server device 104 when the terminal device 102 is verified.

At step S803, the encrypted original pictures are decrypted by using the unique key to obtain the original pictures.

After obtaining the encrypted original pictures and the key from the server device 103 and said another device respectively in steps S801 and S802, the terminal device 102 decrypts the encrypted original pictures with the key to obtain the original pictures.

According to the picture synchronization method 800 described above with reference to FIGS. 1 and 8, the encrypted pictures and the key are managed by two separate devices, and thus the terminal device which desires to perform synchronization can recover the original pictures only when obtaining both the encrypted picture and the key from the two separate devices, and accordingly the picture data synchronization with the terminal device storing the original pictures can be implemented. Thereby, the picture sharing among a plurality of terminal devices can be implemented through the server side while the security of the picture date can be ensured.

The picture management method and the picture synchronization method according to the embodiments of the present disclosure have been described above with reference to the drawings. It is to be understood that the flow charts of the steps and the description of the methods in the present disclosure are only illustrative examples and are not intended to require or imply that the steps of the embodiments should be performed in the order as described, and some of the steps can be performed in parallel, independently of each other or in other suitable order. For example, in the example as shown in FIG. 5, steps S505 and S506 can be performed before or in parallel with step S504, steps S507 and S508 can be performed before or in parallel with steps S505 and S506, and so on.

Figure 9A:
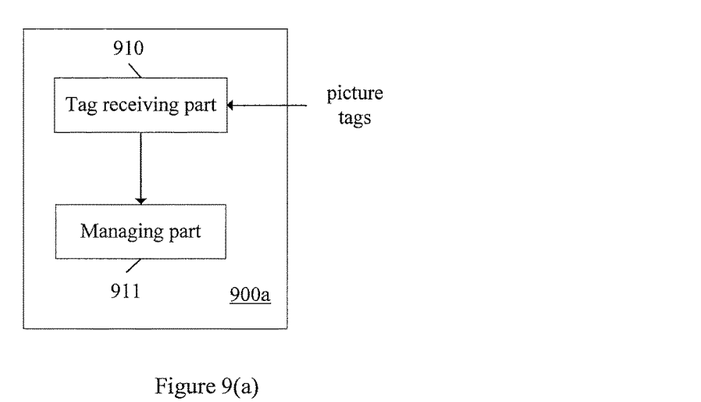

A picture management device according to an embodiment of the present disclosure will be described below with reference to FIGS. 9(a) and 9(b). FIG. 9(a) shows an exemplary structural block diagram of a picture management device 900a according to one embodiment of the present disclosure. The picture management device 900a can function as the terminal device 101 or 102 as shown in FIG. 1, wherein the original pictures to be managed are initially stored in the terminal device 101 and are not stored in the terminal device 102 initially.

As shown in FIG. 9(a), the picture management device 900a can include a tag receiving part 910 and a management part 911 which can perform the steps/functions of the picture management method 200 as described above with reference to FIG. 2, respectively. Therefore, only the main functions of the parts of the picture management device 900a will be described below, and the detailed contents which have been described above will be omitted.

The tag receiving part 910 is configured to receive picture tags generated by a server device performing an image analysis based on received original picture features. The original picture feature is the original picture itself or original picture parameter(s). The original picture parameter is any suitable parameter that is related to the original picture and can be used for performing an image analysis. For example, it can be compressed codes of the original picture to be organized and managed, an image feature of the original picture, or the combination thereof. The image feature of the original picture is the feature that can be used to analyze the image in the current image processing field, such as Histogram of Gradient (HOG), Scale-invariant Feature Transform (SIFT), characteristic layer of depth network or the like. The server device performs various suitable image analyses such as human face detection/recognition, text detection/recognition, object detection/recognition, and scene recognition on the received original picture feature, so as to generate the picture tags reflecting the content of the pictures.

The management part 911 is configured to classify and archive the original pictures represented by the original picture features according to the picture tags. The picture tags are generated based on the original picture features, and the original picture feature is the compressed codes and/or an image feature that can represent the original picture or the original picture itself. Therefore, the management part 911 can perform various picture managements, such as classifying and archiving, creating index or the like, on the original pictures represented by the original picture features based on the picture tags received by the tag receiving part 910.

The picture management device 900a can classify and archive the original pictures, create index for the original pictures and so on based on the content of the pictures so that the user can search the pictures according to the content thereof, which makes the search more efficient and humanized. In another aspect, since the picture tags are not generated locally on the picture management device 900a but generated by the server device performing image processing, the picture management device 900a does not need a large amount of resources for performing a large amount of data calculations.

As an example, when the picture management device 900a functions as the terminal device 101 as shown in FIG. 1, and the original picture feature is the original picture parameter(s), the device 900a can further include a transmitting part configured to transmit the original pictures to the server device. As another example, the original picture feature is the original picture parameter(s), and the device 900a can further include a key generating part configured to generate a unique key bonded with the terminal device, an encryption part configured to encrypt the original pictures with the unique key, and a transmitting part configured to transmit the encrypted original pictures to the server device.

When the picture management device 900a functions as the terminal device 102 as shown in FIG. 1, as an example, the device 900a can further include a picture receiving part configured to receive the original pictures that the server device receives from another terminal device other than the picture management device. As another example, the original picture feature is the original picture parameter(s) and the device 900a can further include a picture receiving part configured to receive the encrypted original pictures which the server device receives from a terminal device other than the picture management device, a key receiving part configured to receive the unique key which is used for encrypting the original pictures from another device different from the server device, and a decryption part configured to decrypt the encrypted original pictures with the unique key to obtain the original pictures. In this example, the key receiving part can be configured to receive the unique key from said another terminal device, or configured to receive, from another server device, the unique key which is transmitted to said another server device from said another terminal device.

Figure 9B:
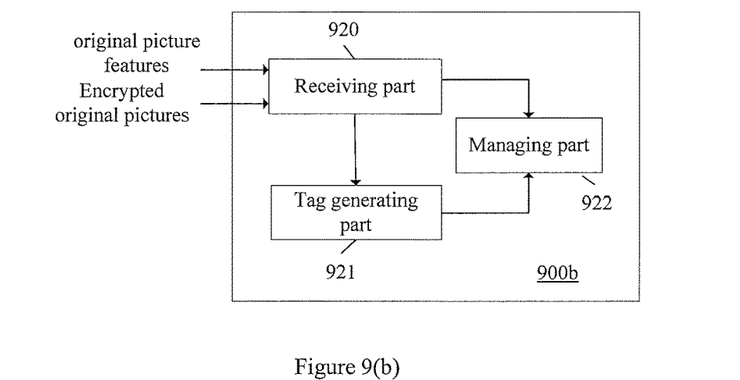

FIG. 9(b) shows an exemplary structural block diagram of a picture management device 900b according to another embodiment of the present disclosure. The picture management device 900b can function as the server device 103 as shown in FIG. 1. As shown in FIG. 9(b), the picture management device 900b may include a receiving part 920, a tag generating part 921 and a management part 922. These parts can perform the steps/functions of the picture management method 400 as described above with reference to FIG. 4, respectively. Therefore, only the main functions of the parts of the picture management device 900b will be described below, and the detailed contents which have been described above will be omitted The receiving part 920 is configured to receive the original picture features and the encrypted original pictures. The original picture feature is the original picture itself or original picture parameter(s). The original picture features and the encrypted original pictures can be from a client device which stores a large amount of original pictures and desires to perform picture backup on the server device.

The tag generating part 921 is configured to perform an image analysis on the received original picture features so as to generate picture tags, and to discard the original picture features after generating the picture tags. The tag generating part 921 performs various suitable image analyses such as human face detection and recognition, text detection and recognition, object detection and recognition, and scene recognition on the received original picture feature so as to generate the picture tags reflecting the content of the pictures. Subsequently, after generating the picture tags, the tag generating part 921 discards the original picture features initiatively.

The management part 922 is configured to classify and archive the encrypted original pictures represented by the original picture features based on the picture tags. The picture tags are generated based on the original picture features, and the original picture feature is the compressed codes and/or an image feature that can represent the original picture or the original picture itself. Therefore, after the tag generating part 921 generates the picture tags reflecting the content of the pictures, the management part 922 may perform various picture managements (such as classifying and archiving, creating index or the like) on the received encrypted original pictures based on the picture tags.

It is to be noted that when the security of the picture data is not required, alternatively, the receiving part 920 can receive the original pictures themselves instead of the encrypted original pictures, and accordingly, the management part 922 can classify and archive the original pictures based on the picture tags. According to this alternative implementation, the picture management device 900b also can classify and archive the pictures, create index for the pictures and so on based on the content of the pictures so that the pictures can be searched based on the content of the pictures.

Figure 10:
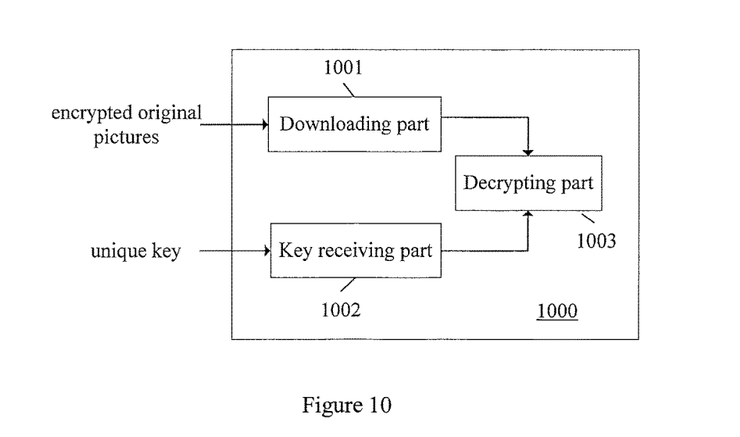
FIG. 10 shows an exemplary structural block diagram of a picture synchronization device according to an embodiment of the present disclosure.

FIG. 10 shows an exemplary structural block diagram of a picture synchronization device 1000 according to an embodiment of the present disclosure. The picture synchronization device 1000 can function as the terminal device 101 or 102 as shown in FIG. 1. For the ease of explanation, in this embodiment, the description will be given with respect to the example that the picture synchronization device 1000 functions as the client device 102 so that the original pictures in the terminal device 101 are synchronized, and vice versa.

As shown in FIG. 10, the picture synchronization device 1000 can include a downloading part 1001, a key receiving part 1002 and a decrypting part 1003. These parts can perform the steps/functions of the picture synchronization method 800 as described above with reference to FIG. 8, respectively. Therefore, only the main functions of the parts of the picture synchronization device 1000 will be described below, and the detailed contents which have been described above will be omitted.

The downloading device 1001 is configured to download from the server device the encrypted original picture which is generated and uploaded to the server device by another terminal device. Said another terminal device is a device storing the original pictures to be synchronized and may generate the encrypted original pictures and upload them to the server device by performing the processes of generating a unique key bonded with said another terminal device, encrypting the original pictures with the unique key, and transmitting the encrypted original pictures to the server device, as described previously.

The key receiving part 1002 is configured to receive the unique key which is used in encrypting the original pictures from a device different from the server device. As an example, the device different from the server device may be said another terminal device which generates the key. Consequently, in this example, the key receiving part 1002 receives the key from said another terminal device through a network transmitting manner of non-backup such as P2P transmission, Bluetooth or the like. As another example, the device different from the server device may be another server device to which the key is transmitted in advance by said another terminal device generating the key. Consequently, in this example, said another server device performs identity verification on the key receiving part 1002, and the key receiving part 1002 obtains the key from said another server device when it is verified.

The decrypting part 1003 is configured to decrypt the encrypted original pictures downloaded by the downloading device 1001 by using the unique key obtained by the key receiving part 1002 to obtain the original pictures.

Figure 11:
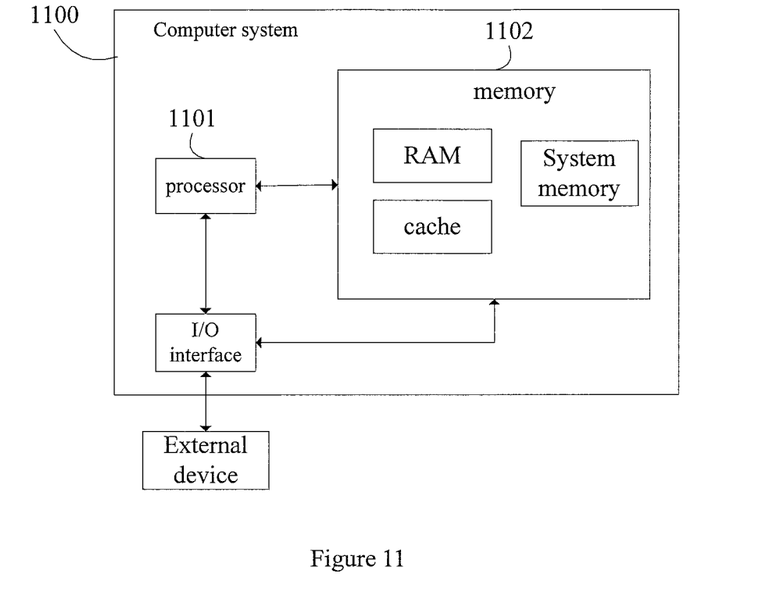
FIG. 11 shows a block diagram of an exemplary computer system adapted to implement the embodiments of the present disclosure.

FIG. 11 shows a block diagram of an exemplary computer system 1100 adapted to implement the embodiments of the present disclosure. As shown in FIG. 11, the computer system may include but is not limited to one or more processor 1101 and memory 1102 for storing computer program instructions.

The processor 1101 can be any device having processing ability, which can implement the functions of the embodiments of the present disclosure and can be, for example, general purpose processor, digital signal processor (DSP), ASIC, field programmable gate array signal (FPGA) or other programmable logic device (PLD), discrete gate or transistor logic, discrete hardware component which is designed to implement the function as described here, or any combination thereof.

The memory 1102 may include computer system readable medium in the form of volatile memory such as random access memory (RAM) and/or cache memory, or other removable/immovable, volatile/non-volatile computer system memory such as hard drive, floppy disk, CD-ROM, DVD-ROM or other optical storage medium.

The computer program instructions, when being executed by at least one of the processors, may implement the functions of the functional modules of the devices according to the embodiments of the present disclosure and/or may perform the methods according to the embodiments of the present disclosure.

In specific, when the illustrative computer system shown in FIG. 11 is used as a picture management system for performing the picture management method according to one embodiment of the present disclosure, the computer program instructions, when being executed by the at least one of the processors, perform the processes of: receiving picture tags generated by a server device performing an image analysis based on original picture features received by the server device, the original picture feature being an original picture itself or original picture parameter(s); and classifying and archiving the original pictures represented by the original picture features according to the picture tags.

As an example, the original pictures are stored in the memory. In the case that the original picture feature is the original picture parameter, the computer program instructions, when being executed by at least one of the processors, further perform the process of transmitting the original pictures to the server device.

As an example, the original pictures are stored in the memory. In the case that the original picture feature is the original picture parameter, the computer program instructions, when being executed by at least one of the processors, further perform the process of generating a unique key bonded with the client device; encrypting the original pictures with the unique key; and transmitting the encrypted original pictures to the server device.

As an example, the original picture feature is the original picture parameter(s), and the computer program instructions, when being executed by at least one of the processors, further perform the process of: receiving the original pictures which the server device received from another client device different from the client device.

As an example, the original picture feature is the original picture parameter(s), and the computer program instructions, when being executed by at least one of the processors, further perform the processes of: receiving encrypted original pictures which the server device received from another device; receiving a unique key which is used for encrypting the original pictures from another device different from said server device; and decrypting the encrypted original pictures with the unique key to obtain the original pictures.

When the illustrative computer system shown in FIG. 11 is used as a picture management system for performing the picture management method according to another embodiment of the present disclosure, the computer program instructions, when being executed by at least one of the processors, perform the processes of receiving original picture features and encrypted original pictures, the original picture feature being an original picture itself or original picture parameter(s); generating picture tags by performing an image analysis on the received original picture features, and discarding the original picture features after generating the picture tags; and classifying and archiving the encrypted original pictures represented by the original picture features according to the picture tags.

As an example, when the security of the picture data is not required, the picture management system can receive the original pictures themselves instead of the encrypted original pictures, that is, the computer program instructions, when being executed by at least one of the processors, perform the processes of receiving the original pictures, performing an image analysis on the received original pictures so as to generate picture tags, and classifying and archiving the original pictures based on the picture tags.

When the illustrative computer system shown in FIG. 11 is used as a picture synchronization system for performing the picture synchronization method according to one embodiment of the present disclosure, the computer program instructions, when being executed by at least one of the processors, perform the process of downloading, from a server device, encrypted original pictures which are generated and uploaded to the server device by a client device; receiving a unique key which is used in encrypting original pictures from a device different from the server device, and decrypting the encrypted original pictures with the unique key to obtain the original pictures.

As an example, the process of receiving the unique key which is used in encrypting the original pictures from a device different from the server device performed when the computer program instructions are executed by the at least one of the processors further includes receiving the unique key from said one client device.

As an example, the process of receiving the unique key which is used in encrypting the original pictures from the device different from the server device performed when the computer program instructions are executed by the at least one of the processors further includes receiving from another server device the unique key which is transmitted to said another server device from said one client device.

In addition, the picture management method/device and the picture synchronization method/device according to the present disclosure can also be implemented by providing computer program products embodying program codes for carrying out the methods or devices, or by any storage medium which stores such computer program products.

The main principles of the present disclosure have been described above with reference to the drawings. However, it is to be noted that the advantage, predominance, effect and so on are merely exemplary but not limitation, and should not be interpreted to be necessary for the embodiments of the present disclosure. In addition, the specific details are disclosed only for the purpose of illustration and ease of understanding but not for limitation. These details will not restrict the present disclosure to be implemented necessarily by employing these details.

The block diagrams of the devices, means, apparatus and system involved in the present disclosure are only illustrative examples and not intended to require or imply that they should be connected, arranged or configured in the manner shown in the diagrams. As will be realized by those skilled in the art, these devices, means, apparatus and system can be connected, arranged or configured in any way. The terms such as "including", "comprising", "having" or the like are open-meaning words, refers to "including but not limited to", and can be exchanged therewith. The teems of "or" and "and" used herein refer to "and/or" and can be exchanged therewith unless the context explicitly indicates not. The terms of "such as" used herein refer to "such as but not limited to" and can be exchanged therewith.

In addition, as used herein, the word of "or" used in the list of items beginning with "at least of one" indicates separate listing so that the list of "at least one of A, B or C" means A or B or C, AB or AC or BC, or ABC (that is, A and B and C). In addition, the term of "exemplary" does not indicate that the example in question is preferable or better than other examples.

It is also to be noted that in the device and method of the present disclosure, the parts or the steps can be divided and/or re-combined. The division and/or recombination should be considered as equivalent solutions of the present disclosure.

It can be understood by those skilled in the art that all or any parts of the devices and methods of the present disclosure can be implemented in any computing device (including processor, storage medium and so on) or network of the computing device in hardware, firmware, software or the combination thereof. The hardware can be general purpose processor, digital signal processor (DSP), ASIC, field programmable gate array signal (FPGA) or other programmable logic device (PLD), discrete gate or transistor logic, discrete hardware component which is designed to implement the function as described here, or any combination thereof. The general purpose processor can be a microprocessor, but alternatively, the processor can be any processor, controller, microcontroller or state machine that is commercially available. The processor can also be a combination of computing devices such as a combination of DSP and microprocessor, a plurality of microprocessors, one or more microprocessors in cooperation with DSP core or any other configuration. The software can exist in computer readable, tangible storage medium of any form. By way of example but not limitation, such computer readable, tangible storage medium can include RAM, ROM, EEPROM, CD-ROM or other optical disc storage device, magnetic disc storage device or other magnetic storage device or any other tangible storage medium which can carry or store desired program codes in the form of instruction or data structure and can be accessed by computer. As used here, disc includes compact disc (CD), laser disc, optical disc, digital versatile disc (DVD), floppy disc and Blu-ray disc.

Various change, replacement or alternation to the present disclosure can be made without departing from the techniques defined in the claims. In addition, the scope of the claims of the present disclosure is not limited to the specific aspects of process, machine, manufacturing, composition of event, measure, method and action as described above. The process, machine, manufacturing, composition of event, measure, method and action which are currently existing or to be developed in the future and can perform substantially the same function or achieve substantially the same effect as the corresponding aspect as described here can be employed. Therefore, such process, machine, manufacturing, composition of event, measure, method and action are within the scope of the appended claims.

The above description of the aspects of the present disclosure is provided to enable those skilled in the art to make or use the present disclosure. Various modifications to these aspects are obvious to those skilled in the art and the general principles defined here can be applied to other aspects without departing from the scope of the present disclosure. Therefore, the present disclosure is not intended to be restricted to the aspects disclosed here and should accord the broadest scope consistent with the principles and novel features disclosed here.

The above description is given in the purpose of illustration and explanation. In addition, the description is not intended to restrict the embodiments of the present disclosure to the form disclosed here. Although a plurality of exemplary aspects and embodiments have been discussed, those skilled in the art can conceive of other alternation, modification, change, addition and sub-combination thereof.

What is claimed is:

1. A picture management method applied to a client device, the method comprising:
   receiving, by the client device, picture tags generated by a server device performing an image analysis based on original picture features received by the server device; and
   classifying and archiving, by the client device, the original pictures represented by the original picture features according to the picture tags,
   wherein the original picture feature is the original picture parameter and the method further comprises: before classifying and archiving the original pictures represented by the original picture features according to the picture tags
   receiving encrypted original pictures which the server device received from another client device different from said client device;

receiving a unique key which is used for encrypting the original pictures from another device different from said server device; and decrypting the encrypted original pictures with the unique key to obtain the original pictures.

2. The picture management method according to claim 1, wherein said receiving the unique key which is used for encrypting the original pictures from another device different from said server device further comprises:

receiving the unique key from said another client device.

3. The picture management method according to claim 1, wherein said receiving the unique key which is used for encrypting the original pictures from another device different from said client device further comprises:

receiving from another server device the unique key which is transmitted to said another server device from said another client device.

* * * * *